United States Patent
Gum et al.

[11] Patent Number: 6,007,858
[45] Date of Patent: Dec. 28, 1999

[54] TAMALE PRODUCT

[75] Inventors: Ernest Kemp Gum, New Fairfield; Jau Yann Hsu, Brookfield; Kaj F. Knudsen; Louise Barbara Wyant, both of New Milford, all of Conn.

[73] Assignee: Nestec S.A., Vevey, Switzerland

[21] Appl. No.: 09/197,749

[22] Filed: Nov. 20, 1998

[51] Int. Cl.$^6$ ..................................... A21D 2/26

[52] U.S. Cl. .................... 426/297; 426/549; 426/560; 426/622; 426/629; 426/656; 426/502; 426/504; 426/510; 426/512; 426/517

[58] Field of Search .................... 426/297, 549, 426/560, 615, 622, 629, 656, 496, 502, 504, 510, 512, 517

[56] References Cited

U.S. PATENT DOCUMENTS

| | | | |
|---|---|---|---|
| 3,649,303 | 3/1972 | Hayhurst et al. | 99/182 |
| 3,653,915 | 4/1972 | Rubio | 99/80 R |
| 3,730,732 | 5/1973 | Barrera | 99/80 R |
| 3,736,088 | 5/1973 | Jimenez | 425/218 |
| 3,778,209 | 12/1973 | Wallace et al. | 425/133 |
| 4,199,612 | 4/1980 | Fragas | 426/622 |
| 4,207,046 | 6/1980 | Ayala | 425/133.1 |
| 4,251,201 | 2/1981 | Krysiak | 425/132 |
| 4,498,377 | 2/1985 | Smith | 99/450 |
| 4,687,670 | 8/1987 | Rodriguez | 426/297 |
| 5,195,424 | 3/1993 | Guajaca | 99/418 |
| 5,437,076 | 8/1995 | Vasquez | 15/236.05 |
| 5,536,522 | 7/1996 | Seeds et al. | 426/656 X |
| 5,667,821 | 9/1997 | Castaneda | 425/218 |
| 5,752,432 | 5/1998 | Burchfield | 99/426 |

FOREIGN PATENT DOCUMENTS

| | | |
|---|---|---|
| 2059165 | 9/1993 | Canada . |
| 2174816 | 9/1997 | Canada . |
| 304161 | 7/1997 | Taiwan . |
| WO9818331 | 6/1998 | WIPO . |

*Primary Examiner*—Milton Cano
*Attorney, Agent, or Firm*—Pennie & Edmonds LLP

[57] ABSTRACT

A tamale roll prepared from a dough comprising from 1 to 15% by weight of wheat gluten in the presence of a humectant such as glycerol and/or maltodextrin, processes for preparing the tamale roll by steaming tamale shape dough followed by freezing or packaging in nitrogen gas, carbon dioxide or their combinations and kept refrigerated. An edible filling such as a meat or cheese filling may be placed on the tamale roll to make a tamale for serving.

18 Claims, No Drawings

TAMALE PRODUCT

FIELD OF THE INVENTION

The present invention relates to Tamale products, more particularly to refrigerated Tamale roll products and the processes of preparing them.

BACKGROUND OF THE INVENTION

Conventionally, tamales are made from corn, also known as maize. One known method of preparing tamale rolls involves mixing corn masa (corn masa is made by soaking and cooking corn in water with lye treatment, and then grinding to a paste), lard, water or broth, and spices into a corn meal tamale dough which is placed on a corn husk wrapped around a filling (such as meat or cheese filling) and steamed to make tamale roll with filling, the tamale.

Instead of preparing corn masa, another conventional method used to prepare tamale rolls involves the use of Masa Harina flour, an alkaline treated corn flour with desirable flavor and dough consistency, which is mixed with lard, salt, baking powder, water or broth and spices to form the tamale dough which is placed on a corn husk wrapped around a filling (such as meat or cheese filling) and steamed to make tamale.

In both cases, the steamed tamale corn meal dough is a soft mass and needs a "wrapper" to hold it (the "wrapper" may be, for instance, corn husks, banana leaves or corn leaves). There are two disadvantages of the conventional tamale roll:

(i) after it is made, it has no strength, is breaks easily on bending or folding, and (ii) it has to be kept frozen since it has a moisture content of 48–55% and water activity of 0.97–0.98 which can be kept at refrigerated temperature only for a very short period of time.

SUMMARY OF THE INVENTION

We have found that by adding wheat gluten, a firm structure can be obtained which ensures that the tamale roll does not break easily on bending or folding. In addition, we have found that the use of humectants such as glycerine and maltodextrin to lower the water activity for preservation also maintains the moisture content to provide the softness of "tamale roll": this enables the tamale roll to be stored at refrigerated temperatures.

According to the present invention there is provided a tamale roll prepared from a dough comprising from 1 to 15% by weight of wheat gluten by weight based on the weight of the dough.

DETAILED DESCRIPTION OF THE INVENTION

The amount of wheat gluten is preferably from 2.5% to 12.5% and more preferably from 5% to 10% by weight based on the weight of the dough. If desired, vital wheat gluten may be used.

The dough may be prepared from corn, a shortening and water. The corn may be corn masa, Masa Harina flour or corn flour with pre-cooked corn flour added. If desired, a mixture of regular corn flour and up to 25% by weight, preferably from 10% to 15% by weight of pre-cooked corn flour may be used based on the weight of the corn flour. In this invention it should be understood that corn is synonymous with maize.

The shortening may be any conventional shortening such as lard or a vegetable fat. If desired, a broth may be included. If desired, a leavening agent may be present, e.g. baking powder in the absence or presence of a food-grade encapsulated alkali metal bicarbonate or yeast. The use of encapsulated alkali metal bicarbonate is to delay the leavening action until the subsequent steaming step. The amount of corn may be from about 20% to 40% and preferably from 25% to 35% by weight based on the weight of the dough. The amount of water may be from about 20% to 50% and preferably from 25% to 40% by weight based on the weight of the dough.

Advantageously, a humectant may be present, for instance in an amount up to 20% by weight based on the weight of the dough. For instance, the humectant may be glycerol or maltodextrin. The amount of glycerol may be from 1% to 10% and preferably from 2% to 8% by weight based on the weight of the dough. The amount of maltodextrin may be from 2% to 15% and preferably from 3% to 10% by weight based on the weight of the dough. The moisture content of the tamale roll may be from 36% to 46% and preferably from 38% to 44%. The water activity may be from 0.85 to 0.97 and preferably from 0.88 to 0.95.

The present invention also provides a method of preparing a tamale roll which process comprises mixing corn, a shortening and water together with from 1 to 15% by weight of wheat gluten to form a dough which is sheeted, folded, steamed and then cooled.

The dough may be sheeted by rolling between two sheets of parchment paper to a desired thickness, e.g. 0.25 to 1.25 cm, preferably from 0.4 to 1.0 cm and more preferably from 0.5 to 0.75 cm.

When the sheeted dough is folded, it may be wrapped around an edible filling such as meat or cheese or around a mechanical support such as a rod or tube.

The steaming may be carried out conventionally, e.g. for a period of from 3 to 15 minutes at a temperature from 85° to 100° C. and preferably from 90° to 98° C., conveniently in a steam blancher.

The tamale roll may be kept frozen or packaged in nitrogen gas, carbon dioxide or their combinations and kept refrigerated.

The tamale roll product of this invention is similar to taco shell for use in tortillas wherein an edible filling such as a meat or cheese filling can be placed on the tamale roll to make the tamale for serving. The tamale roll can be kept frozen or kept at refrigerated temperature for 40 to 60 days without using preservatives.

The following Examples further illustrate this invention.

EXAMPLE 1

Sample A

Pre-mix 0.6% salt and 37.5% Masa Harina flour, then add in 8.6% chicken broth and 37.6% water. Mix well, then add 14.5% vegetable shortening (e.g. ADM's C.T. product) and mix until uniform. Mix in 0.6% baking powder and 0.6% encapsulated sodium bicarbonate (e.g. Balchem's Cap-Shure SB-140-70B). Roll the dough between 2 sheets of parchment paper to a dough thickness of ⅜". Wrap dough around a 1 ⅝" diameter tube. Place tube in a steam blancher and steam for 10 minutes (91°–93° C. temperature). Remove from the blancher and allow the tamale roll to cool.

Sample B

Same as sample A, except that 7.5% of Masa Harina flour is substituted by vital wheat gluten.

Comparison of sample A and B by bending them shows sample A has no strength, whereby it will break while sample B can be bent and folded and used as a tamale roll.

EXAMPLE 2

Sample A

Pre-mix 0.6% salt, 7.5% vital wheat gluten and 30% Masa Harina flour, then add 8.6% chicken broth and 37.6% water. Mix well. Mix in 14.5% vegetable shortening (e.g. ADM's C.T. product), mix until uniform. Add 0.6% baking powder and 0.6% encapsulated sodium bicarbonate (e.g. Balchem's CAP-Shure SB-140-70B). Mix well. Roll dough between 2 sheets of parchment paper to a dough thickness of 3/16". Place the dough (between parchment paper) in asteam blancher and steam for 10 minutes (91°–93° C. temperature). Take out from blancher, remove the top sheet of parchment, wrap around a tube (1 5/8" diameter) and allow the tamale roll to cool. Carefully remove the parchment and unroll from the tube. Place the tamale roll in a tray and package with nitrogen gas.

Sample B

Same a sample A, except that 5% of Masa Harina flour and 5% of water are substituted by 10% glycerine.

Sample C

Same as sample A, except that 11.6% of water is substituted by 5% glycerine, 5% maltodextrin (e.g. GPC's Maltrin MO40) and 1% salt Comparison of sample A,B & C shows similar soft texture and moistness, but their moisture content and water activity are different and they are as follows;

|  | A | B | C |
| --- | --- | --- | --- |
| Moisture content | 47.6% | 44.4% | 38.5% |
| Water activity | 0.983 | 0.929 | 0.915 |

Based on water activity, sample A can not have a 40–60 days shelf life in refrigerated temperature but sample B and C should have. Storage test of sample C after 42 days showed the following microbiological test results;

| Storage Days | Total plate count | Coliform | Lactic acid bacteria | Yeast/mold | B. Cereus | Staph. |
| --- | --- | --- | --- | --- | --- | --- |
| 1 | $2.0 \times 10^2$ | <10 | <100 | <100 | <100 | <100 |
| 41 | $1.5 \times 10^2$ | <10 | <100 | <100 | <100 | <100 |

We claim:

1. A tamale roll prepared from a dough comprising corn and from 1 to 15% by weight of wheat gluten by weight based on the weight of the dough.

2. A tamale roll according to claim 1 wherein the amount of wheat gluten is from 2.5% to 12.5% by weight based on the weight of the dough.

3. A tamale roll according to claim 1 wherein the dough is prepared from corn, a shortening and water.

4. A tamale roll according to claim 3 wherein the corn is corn masa, Masa Harina flour or corn flour with pre-cooked corn flour.

5. A tamale roll according to claim 3 wherein a mixture of regular corn flour and up to 25% by weight of pre-cooked corn flour is used based on the weight of the corn flour.

6. A tamale roll according to claim 3 wherein the amount of corn is from about 20% to 40% by weight based on the weight of the dough.

7. A tamale roll according to claim 1 wherein the amount of water is from about 20% to 50% by weight based on the weight of the dough.

8. A tamale roll according to claim 1 wherein a humectant is present in an amount up to 20% by weight based on the weight of the dough.

9. A tamale roll according to claim 8 wherein the humectant is glycerol or maltodextrin.

10. A tamale roll according to claim 8 wherein the amount of glycerol is from 1% to 10% by weight based on the weight of the dough.

11. A tamale roll according to claim 8 wherein the amount of maltodextrin is from 2% to 15% by weight based on the weight of the dough.

12. A tamale roll according to claim 1 wherein the moisture content of the tamale roll is from 36% to 46%.

13. A tamale roll according to claim 1 wherein the water activity is from 0.85 to 0.97.

14. A tamale roll according to claim 1 wherein an edible filling is placed on the tamale roll to make a tamale for serving.

15. A method of preparing a tamale roll which process comprises the steps of:

mixing corn, a shortening and water together with from 1 to 15% by weight of wheat gluten to from a dough;

sheeting and folding the dough to form the roll;

steaming the roll; and then cooling the steamed roll.

16. A process according to claim 15 wherein the dough is sheeted by rolling between two sheets of parchment paper to a thickness of from 0.25 to 1.25 cm.

17. A process according to claim 15 wherein when the sheeted dough is folded, it is wrapped around an edible filling or around a mechanical support.

18. A process according to claim 15 wherein the tamale roll is kept frozen or packaged in nitrogen gas, carbon dioxide or their combinations and kept refrigerated.

* * * * *